United States Patent
Villien et al.

(10) Patent No.: US 12,436,295 B2
(45) Date of Patent: Oct. 7, 2025

(54) METHOD FOR LOCATING A NAVIGATION UNIT

(71) Applicant: Commissariat à l'Energie Atomique et aux Energies Alternatives, Paris (FR)

(72) Inventors: Christophe Villien, Grenoble (FR); Christophe Combettes, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 306 days.

(21) Appl. No.: 18/328,017

(22) Filed: Jun. 2, 2023

(65) Prior Publication Data
US 2024/0183933 A1    Jun. 6, 2024

(30) Foreign Application Priority Data
Jun. 2, 2022    (FR) ..................................... 22 05306

(51) Int. Cl.
*G01S 19/22* (2010.01)
*G01S 19/39* (2010.01)

(52) U.S. Cl.
CPC ............ *G01S 19/22* (2013.01); *G01S 19/393* (2019.08)

(58) Field of Classification Search
CPC ........ G01S 19/22; G01S 19/428; G01S 19/47; G01S 19/41; G01S 19/44; G01S 19/49; G01S 19/43; G01S 19/071; G01S 9/41; G01S 5/009; G01S 19/393
See application file for complete search history.

(56) References Cited

U.S. PATENT DOCUMENTS

| | | | |
|---|---|---|---|
| 6,324,473 B1 | 11/2001 | Eschenbach | |
| 8,031,110 B2 * | 10/2011 | Abou Ghaida | G01S 19/05 342/357.23 |
| 2011/0156954 A1 * | 6/2011 | Roh | G01S 19/40 342/357.69 |
| 2013/0321202 A1 * | 12/2013 | Lin | G01S 19/428 342/357.61 |

(Continued)

FOREIGN PATENT DOCUMENTS

FR    3 066 027 A1    11/2018

OTHER PUBLICATIONS

French Preliminary Search Report issued Feb. 8, 2023, in French Application 22 05306 filed on Jun. 2, 2022 8 pages (with English Translation of Categories of Cited Documents & Written Opinion).

(Continued)

*Primary Examiner* — Cassi J Galt
(74) *Attorney, Agent, or Firm* — Oblon, McClelland, Maier & Neustadt, L.L.P.

(57) ABSTRACT

A method includes establishing, for a given time, measurement biases allowing an error affecting raw measurements of pseudoranges separating a navigation unit from at least three beacons to be decreased, and estimating an external position of the navigation unit at the given time based on: beacon positions, corrected pseudorange measurements computed for the given time using established measurement biases, and a preceding external position of the navigation unit estimated for a time preceding the given time. The measurement biases are established without taking into account the external position of the navigation unit.

7 Claims, 3 Drawing Sheets

(56) References Cited

U.S. PATENT DOCUMENTS

2015/0268354 A1     9/2015   Monnerat et al.
2021/0325544 A1*   10/2021   Bageshwar ............. G01S 19/52

OTHER PUBLICATIONS

Al et al., "Evaluation and mitigation of the influence of pseudorange biases on GNSS satellite clock offset estimation" Measurement, Institute of Measurement and Control. vol. 193, 2022, XP087008180, 14 pages.
Nilchan et al., "Improvement of Kalman Filter for GNSS/IMU Data Fusion with Measurement Bias Compensation" Nagoya (Online Conference), 2020, 6 pages.
Kuusniemi et al., "GNSS Signal Reliability Testing in Urban and Indoor Environments" Proceedings of NTM 2004 Conference (Session A2), the Institute of Navigation, 2004, 15 pages.
"Global Navigation Satellite System" Glonass ICD. Version 5.0, 2002, 54 pages.
Giremus et al., "A Particle Filtering Approach for Joint Detection/Estimation of Multipath Effects on GPS Measurements" International Conference on Acoustics, Speech, and Signal Processing. 2005, 11 pages.
"European GNSS (Galileo) Open Service Signal-In-Space Interface Control Document" Navigation Solutions Powered By Europe. Issue 1.3, 2016, 88 pages.
Andrés, "Integrity monitoring applied to the reception of GNSS signals in urban environments" Université De Toulouse. 2012, 250 pages.
"Navstar GPS Space Segment/Navigation User Interfaces" Navstar Global Positioning System. IS-GPS-200D, 2006, 221 pages.
Collins, "Assessment and Development of a Tropospheric Delay Model for Aircraft Users of the Global Positioning System" Department of Geodesy and Geomatics Engineering, University of New Brunswick, Technical Report No. 203, 1999, 188 pages.
Godha, "Performance Evaluation of Low Cost MEMS-Based IMU Integrated With GPS for Land Vehicle Navigation Application" Department of Geomatics Engineering, UCGE Reports No. 20239, 2006, 230 pages.
Zhu, "GNSS Propagation Channel Modeling in Constrained Environments: Contribution to the Improvement of the Geolocation Service Quality", IFSTTAR, Universite de Lille, 2018, 220 pages.

* cited by examiner

METHOD FOR LOCATING A NAVIGATION UNIT

The invention relates to a method for locating a navigation unit. The invention also relates to a data storage medium and navigation unit for implementing this method.

Locating methods allow a navigation unit to be located in an environment containing beacons transmitting messages. For example, these beacons are satellites in orbit around the Earth. When the beacons are satellites, the navigation unit may be thought of as the user segment of the global navigation satellite system (GNSS) in question. The GNSS of the United States of America is known by the acronym GPS, which stands for Global Positioning System.

Typically, known locating methods comprise the following steps:
- a) receiving messages transmitted by at least three beacons, then
- b) extracting raw measurements of pseudoranges separating the navigation unit from each of the beacons based on the times of receipt of these messages as measured by the navigation unit and on the speed of propagation of these messages through space, then
- c) estimating a position of the navigation unit based on the extracted raw measurements.

This prior art is for example disclosed in US2015/268354A1, U.S. Pat. No. 6,324,472B1 and in the article by Al Quingsong et al.: "Evaluation and mitigation of the influence of pseudorange biases on GNSS satellite clock offset estimation", Measurement, Institute of Measurement and Control, London, Vol. 193, 10/03/2022.

To improve the precision of the estimated position, it is known to correct the raw pseudorange measurements before they are used to estimate the position of the navigation unit. Specifically, the signals transmitted by the beacons may be very noisy.

To correct the raw measurements, the following documents have proposed methods that use the preceding position estimated for the navigation unit:
- patent application FR3066027A1, and
- A. Giremus, J.-Y. Tourneret and V. Calmettes: "A particle filtering approach for joint detection/estimation of multipath effects on GNSS measurements", IEEE Trans. Signal Processing, 2007.

These methods are advantageous because they allow the precision of the location to be improved with respect to locating methods that do not make corrections to the raw pseudorange measurements depending on the preceding position of the navigation unit. However, in practice, these methods are not very robust and run the risk of diverging in the course of time. Specifically, an error in the correction of the raw pseudorange measurements introduces an error into the estimated position. In the following iteration of the method, the erroneous estimated position is then used to correct the new raw pseudorange measurements. The error made in the position estimate may thus increase, in the following iteration, the error made in the correction of the raw pseudorange measurements. Hence, feedback may appear that amplifies the error instead of compensating for it.

The invention aims to remedy this drawback by providing a locating method that uses the position of the navigation unit to correct the raw pseudorange measurements while being more robust.

One subject thereof is therefore a method for locating a navigation unit.

Another subject of the invention is a data storage medium that is readable by a microprocessor, comprising instructions that are executable by this microprocessor, wherein this medium comprises non-transitory instructions for executing the above locating method, when these instructions are executed by the microprocessor.

Lastly, another subject of the invention is a navigation unit configured to implement the above method.

The invention will be better understood on reading the following description, which is given solely by way of non-limiting example, with reference to the drawings, in which.

In these figures, the same references have been used to designate elements that are the same.

In the remainder of this description, features and functions well known to those skilled in the art are not described in detail.

In this description, detailed examples of embodiments are first described in Section I with reference to the figures. Next, in the following section, Section II, variants of these embodiments are introduced. Lastly, the advantages of the various embodiments are presented in Section III.

SECTION I: EXAMPLES OF EMBODIMENTS

Below, a detailed embodiment of the invention is described in the particular context of location of a vehicle on the Earth's surface. In this particular context, the beacons transmitting messages based on which the vehicle may be located are satellites in orbit around the Earth.

Figure 1:
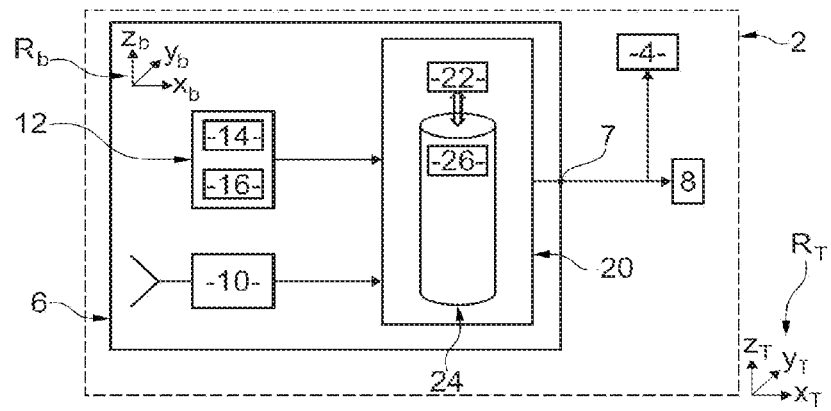
FIG. 1 is a schematic illustration of a system for locating a vehicle comprising a navigation unit.

FIG. 1 shows a vehicle 2 capable of moving over the Earth's surface. To this end, for example, the vehicle 2 comprises wheels or tracks. The vehicle 2 is also equipped with propulsion means 4 such as an engine that drives the wheels or tracks.

The vehicle 2 is equipped with a geolocation system 6 for locating this vehicle. This system 6 is able to determine the position, orientation and velocity of the vehicle 2 in a terrestrial frame of reference $R_T$. Here, the terrestrial frame of reference $R_T$ is fixed without any degree of freedom to the Earth. The frame of reference $R_T$ comprises three axes, which are typically orthogonal to one another. A moving frame of reference $R_b$ is also fixed with no degree of freedom to the vehicle 2. This frame of reference $R_b$ comprises three axes that are orthogonal to one another, denoted $x_b$, $y_b$ and $z_b$, respectively.

Here, the position of the vehicle 2 in the frame of reference $R_T$ is expressed by the latitude L, the longitude A and the altitude h of the origin of the frame of reference $R_b$.

The orientation of the vehicle 2 is expressed by the yaw angle $\psi$, the pitch angle $\theta$ and the roll angle $\Phi$ of the frame of reference $R_b$ with respect to the frame of reference $R_T$.

The position, orientation and velocity determined by the system 6 are delivered to an output 7.

Typically, the vehicle 2 comprises a control unit 8 for guiding or assisting in guiding the vehicle 2 to a predefined destination. The unit 8 is connected to the output 7. The control unit 8 may be manual and/or automatic. In the case of a manual control unit, the determined position, orientation and velocity are transmitted to a human-machine interface with a view to assisting a human being in controlling the propulsion means 4. In the case of an automatic control unit, the determined position, orientation and velocity are automatically converted into commands for controlling the propulsion means 4, then automatically transmitted to these propulsion means 4.

The system 6 comprises a navigation unit 10 and an inertial measurement unit 12.

The navigation unit 10 is capable of determining its position in the frame of reference $R_T$ based on messages transmitted by the satellites. For example, here, the satellites are satellites of the GPS constellation (GPS standing for Global Positioning System). In this context, the unit 10 is known as a GNSS unit (GNSS being the acronym of global navigation satellite system) and corresponds to the user segment of this GNSS. Based on the satellite signals that it receives, the unit 10 generates signals representative of the position and velocity of the vehicle in the frame of reference $R_T$.

The unit 12 is known as an IMU (acronym of inertial measurement unit). The unit 12 notably comprises a triaxial accelerometer 14 and a triaxial gyrometer 16. By virtue of these sensors, the unit 12 is capable of measuring the variation in the orientation of the vehicle 2.

To determine the position, orientation and velocity of the vehicle 2 based on the measurements of the units 10 and 12, the system 6 comprises a programmable electronic computer 20. This computer 20 is able to acquire the measurements of the units 10 and 12 and, based on these measurements, to determine the position, orientation and velocity of the vehicle 2 in the frame of reference $R_T$. The computer 20 comprises a microprocessor 22 and a memory 24.

The memory 24 notably comprises the instructions of a software module 26 able to determine the position, orientation and velocity of the vehicle 2 based on the measurements of the units 10 and 12 when it is executed by the microprocessor 22. The module 26 notably implements a fusion algorithm that establishes, based on a preceding estimation of the position, orientation and velocity of the vehicle 2 and on new measurements of the units 10 and 12 acquired since this preceding estimation, a new estimation of the position, orientation and velocity of the vehicle 2. The fusion algorithm also establishes margins of error in each new estimation.

Such fusion algorithms are well known to those skilled in the art. For example, a presentation of the prior art on the matter may be found in the following thesis: S. Godha "*Performance Evaluation of Low Cost MEMS-Based IMU Integrated With GPS for Land Vehicle Navigation Application*", PhD report, 2006. Below, this thesis is designated by the expression "Godha2006". Typically, this fusion algorithm implements one or more Kalman filters. Here, the module 26 employs a closed-loop integration scheme or closed-loop approach.

Figure 2:
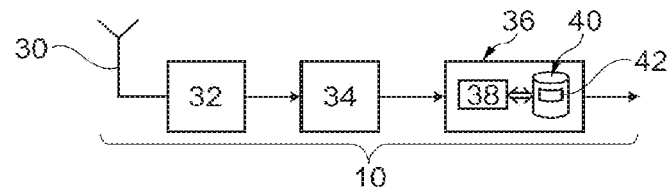
FIG. 2 is a schematic illustration of the navigation unit of the system of FIG. 1.

FIG. 2 shows the main components of the unit 10 in more detail. The unit 10 comprises, in succession:

- an antenna 30 for receiving the GNSS signals transmitted by the satellites,
- an RF front end 32 connected to the antenna 30 and that carries out amplification, filtering, frequency transposition and digitization of the transmitted GNSS signals,
- a baseband processor 34 that receives the signals processed by the RF front end 32, and
- a navigation processor 36 that processes the data transmitted by the baseband processor 34 with a view to locating the unit 10.

The baseband processor 34 acquires the signals processed by the RF front end 32, demodulates them and extracts from the demodulated signals the following data:

- raw measurements Mb relative to these signals, and
- messages Mn transmitted by the satellites.

The messages transmitted by the satellites are known as GNSS messages.

Typically, the raw measurements Mb contain, for each satellite that transmitted a GNSS signal received by the unit 10, at least one raw measurement $Mb_{k,i}$ of the pseudorange separating the unit 10 from this satellite. For example, this raw pseudorange measurement $Mb_{k,i}$ is here computed using the following relationship: $Mb_{k,i} = (tr_{k,i} - te_{k,i}) \times c$, where:

- the index i is a satellite identifier,
- the index k is an identifier of a time $t_k$ defined below,
- $Mb_{k,i}$ is the raw measurement of the pseudorange between the unit 10 and the satellite identified by the index i,
- $tr_{k,i}$ is the time of receipt of the message as measured by the baseband processor 34,
- $te_{k,i}$ is the time of transmission of the message by satellite i, this time $te_{k,i}$ here being contained in the message transmitted by the satellite,
- c is the speed of light, and
- "x" is the symbol representing the operation of multiplication.

The raw measurements may potentially contain other measurements for each satellite, such as:

- a Doppler or frequency-shift measurement,
- a measurement of the phase of the carrier wave of the transmitted GNSS signal, and
- the time of receipt of the transmitted GNSS signal.

These other measurements may be used to estimate, in addition to the position of the unit 10, other physical quantities such as the velocity or clock error of the unit 10. Below, when physical quantities other than the position of the unit 10 are estimated, these other physical quantities are considered to have been estimated in a conventional manner. Thus, below, only processing of the raw pseudorange measurements is described in detail.

The messages Mn contain, for each satellite that transmitted a GNSS signal received by the unit 10: ephemerides or parameters allowing the positions and velocities of the satellite to be estimated. The messages Mn also potentially contain, for each satellite, other data such as:

- parameters of corrections of satellite clock errors,
- elements characterizing the state of the satellite and the state of its measurement,
- parameters of a model for estimating propagation times through the ionosphere and the troposphere.

The navigation processor 36 typically comprises a microprocessor 38 and a memory 40. The memory 40 contains the instructions of a locating software package 42 which locates the unit 10 based on the signals transmitted by the satellites when it is executed by the microprocessor 38. In this embodiment, locating the unit 10 means computing the position, velocity and clock error of the unit 10, i.e. computing a PVT (position, velocity, time) for the unit 10.

More precisely, the software package 42 updates the PVT of the unit 10 at each time $t_k$ of a temporal sequence of times $\{t_0; \ldots; t_{k-1}; t_k; \ldots\}$. For example, this temporal sequence is a periodic sequence of times $t_k$ and the period between two successive times $t_k$ is equal to the sampling period of the GNSS signals. Below, the PVT delivered by the unit 10 to the computer 20 at time $t_k$ is denoted $PVT_k$. In this text, the index k is also used to identify the new measurements, the new messages and the new physical quantities used to estimate $PVT_k$. Thus, the new raw measurements Mb and the new messages Mn obtained from the GNSS signal of a satellite and used to estimate $PVT_k$ are denoted $Mb_{k,i}$ and $Mn_{k,i}$, respectively, where the index i is an identifier of this satellite. To estimate $PVT_{k,i}$ the measurements $Mb_{k,i}$ and the messages $Mn_{k,i}$ of at least three, and in this embodiment at least four, satellites are used. In practice, the number of satellites from which GNSS messages are received by the unit 10 is often higher than five or eight. Thus, the index i is here an integer that varies from 1 to more than 4, 5 or 8.

Figure 3:
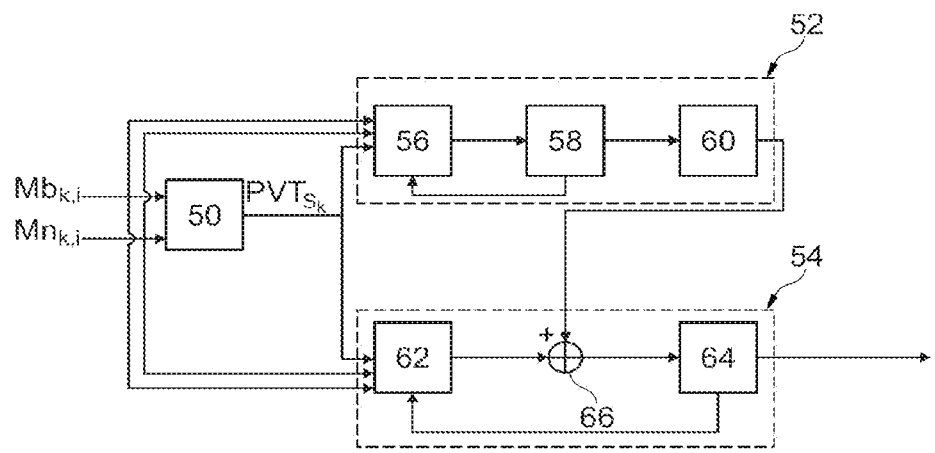
FIG. 3 is a schematic illustration of various software modules implemented in the navigation unit of FIG. 2.

FIG. 3 shows the architecture of the locating software package 42. The software package 42 comprises a module 50 for estimating the position of the satellites based on the measurements $Mb_{k,i}$ and on the data contained in the messages $Mn_{k,i}$ i. More precisely, here, for each time $t_{k,i}$ module 50 estimates new positions, new velocities and new clock errors of the satellites based on the measurements $Mb_{k,i}$ and messages $Mn_{k,i}$ received since the preceding time $t_{k-1}$. In other words, the module 50 estimates the PVT of each satellite i for the time $t_k$. This PVT of satellite i for the time $t_k$ is denoted $PVTs_{k,i}$ below. The vector the i-th coordinate of which is equal to $PVTs_{k,i}$ is denoted $PVTs_k$.

Many methods are known for estimating $PVTs_{k,i}$ based on the measurements $Mb_{k,i}$ and messages $Mn_{k,i}$. For example, to start with, the transmission times of the GNSS signals are estimated based on:
measurement of the times of receipt $tr_k$ of these GNSS signals by the unit 10, and
measurement of the pseudoranges between the satellites and the antenna 30.

Subsequently, the positions, velocities and clock errors of the satellites are estimated by executing an algorithm that uses parameters delivered in the messages $Mn_{k,i}$. For example, this algorithm is one of those provided in the following articles:
*Global navigation satellite system Glonass ICD Navigational radiosignal in bands* L1, L2, Edition 5.1, Russian Institute of Space Device Engineering, 2008, pages 41-49;
*Navstar GPS Space Segment/Navigation User Interfaces*, IS-GPS-200, Revision D, ARINC, March 2006, pages 83-98.

Next, the software package 42 implements:
a process 52 that establishes measurement biases $c2_{k,i}$ that are practically independent of the preceding PVT, i.e. $PVT_{k-1}$, and
a process 54 that estimates $PVT_k$ while using the measurement biases $c2_{k,i}$ to correct the raw measurements $Mb_{k,i}$ and thus improve the precision of $PVT_k$.

A measurement bias is a value that, when it is subtracted from a raw measurement, allows the error affecting this raw measurement to be decreased.

The process 52 receives as input the measurements $Mb_{k,i}$, the data contained in the messages $Mn_{k,i}$ and the $PVTs_{k,i}$ estimated by the module 50. This process 52 delivers as output the biases $c2_{k,i}$ established. This process 52 contains three modules that are executed one after another: a module 56 for correcting and selecting measurements, a module 58 for estimating an internal position $P1_k$ and a module 60 for estimating biases $c2_{k,i}$.

The process 54 of estimating $PVT_k$ has as input data: the $PVTs_{k,i}$, the messages $Mn_{k,i}$, the raw measurements $Mb_{k,i}$ and the biases $c2_{k,i}$ established by process 52. This process 54 is divided into two modules, which are executed one after the other: a module 62 for correcting and selecting the measurements $Mb_{k,i}$, which delivers pre-corrected measurements $Mc2_{k,i}$, and a module 64 for estimating an external PVT denoted $PVT2_k$. The external PVT is delivered to the computer 20. Thus, $PVT2_k$ and $PVT_k$ are the same. Process 54 also comprises a subtractor 66 that subtracts the biases $c2_{k,i}$ from the pre-corrected measurements $Mc2_{k,i}$ delivered by module 62.

Figure 4:
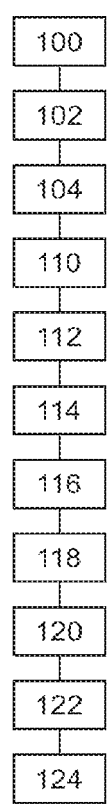
FIG. 4 is a flowchart of a locating method using the navigation unit of FIG. 2.

Examples of embodiment of the various modules of the software package 42 and the operation of the unit 10 will now be described with reference to the method of FIG. 4.

For each time $t_k$ for which a new $PVT_k$ must be delivered to the computer 20, the unit 10 executes the following steps.

In a step 100, the RF front end 32 receives new GNSS signals transmitted by at least three satellites. These GNSS signals are qualified "new" in the sense that they are received after the GNSS signals used to estimate the preceding PVT, $PVT_{k-1}$.

Typically, in step 100, the RF front end 32 receives the GNSS signals transmitted by more than four, and conventionally more than eight, satellites.

In a step 102, the baseband processor 34 extracts, for each of the satellites, from the received new GNSS signals, the raw measurements $Mb_{k,i}$ and the transmitted messages $Mn_{k,i}$ i.

Next, in a step 104, module 50 estimates new PVTs, which are denoted $PVTs_{k,i}$, based on the measurements $Mb_{k,i}$ and on the received messages $Mn_{k,i}$.

In a step 110, module 56 pre-corrects the measurements $Mb_{k,i}$ to obtain pre-corrected measurements $Mc1_{k,i}$. Here, the pre-corrected measurements $Mc1_{k,i}$ are obtained based on the measurements $Mb_{k,i}$, on the data contained in the messages $Mn_{k,i}$, on the $PVTs_{k,i}$ estimated by module 50 and on the preceding internal position $P1_{k-1}$.

Typically, the pre-corrected measurements $Mc1_{k,i}$ are obtained using the following relationship:

$$Mc1_{k,i} = Mb_{k,i} - c1_{k,i}$$

where $c1_{k,i}$ is the correction estimated in this step.

The correction $c1_{k,i}$ is established using a predetermined model m1 of the perturbations introduced by the fact that the GNSS signals pass through the ionosphere and the troposphere. Here, this model m1 is parametrized by the $PVTs_{k,i}$ and the position $P1_{k-1}$. For example, here the model m1 is the model defined in the following article: Collins, J. P., *Assessment and Development of a Tropospheric Delay Model for Aircraft Users of the Global Positioning System*, Technical Report No. 203, University of New Brunswick, 1999, pages 96-97. In this case, the correction $c1_{k,i}$ is computed using the following relationship, relationship (2):

$$c1_{k,i} = \frac{A(P1_{k-1})}{\sin(\theta) + \dfrac{0.00143}{\tan(\theta) + 0.0455}}$$

where:
the angle θ is the elevation angle, i.e. the angle between the plane tangent to the Earth's surface at the point defined by the position $P1_{k-1}$ and the straight line connecting the satellite to this point on the Earth, and
$A(P1_{k-1})$ is a function defined by the following relationship:

$$A = \begin{cases} 2.464 - 3.248 \times 10^{-4} \times h + 0.2395 \times 10^{-8} \times h^2; h < 1000 \text{ m} \\ 2.284 \times \exp(-0.1226 \times (h \times 10^{-3} - 1)) - 0.122; 1000 \text{ m} < h < 9000 \text{ m} \\ 0.7374 \times \exp(1.2816 - 1.424 \times 10^{-4} \times h); 9000 \text{ m} < h \end{cases}$$

where:
- h is the orthometric height of the unit 10, which is obtained based on the position $P1_{k-1}$, and
- for each row of this relationship, the inequality after the semicolon indicates for which range of orthometric heights this row must be used to compute $A(P1_{k-1})$,
- m means the unit of length metres.

Orthometric height h is estimated based on the position $P1_{k-1}$ and a geodetic system.

In a step 112, module 56 selects pre-corrected measurements $Mc1_{k,i}$, these being the only ones to be used in the rest of process 52. The aim of this selection is to eliminate measurements $Mc1_{k,i}$ considered to be excessively erroneous, in order to prevent them from being taken into account in the estimation of the position $P1_k$. This allows precision to be improved. One detailed example of embodiment of this step 112 is described below with reference to FIG. 5. The following steps of process 52 use only the measurements selected in step 112 to compute the biases $c2_{k,i}$. Measurements that are not selected are not used to compute the biases $c2_{k,i}$, and hence the biases $c2_{k,i}$ the index i of which corresponds to a not selected measurement are not updated by process 52 for time $t_k$. In other words, for indices i that correspond to not selected measurements, the bias $c2_{k,i}$ is set equal to $c2_{k-1,i}$. Similarly, for indices i that correspond to not selected measurements, the variance of the bias $c2_{k,i}$ is not updated. It is therefore equal to the variance of the bias $c2_{k-1,i}$. For the following steps of process 52, the index i corresponds only to the indices i of the selected measurements.

In a step 114, module 58 estimates the position $P1_k$ based on the pre-corrected measurements $Mc1_{k,i}$ selected in step 112, on the $PVTs_{k,i}$ estimated in step 104 and on the preceding position $P1_{k-1}$.

Here, module 58 estimates the position $P1_k$ by minimizing the following cost function $f_1$:

$$f_1(X, Mc1_{k,i}, PVT_{S_k}) = \sum_{i \in Ipmin} \omega_i \left( Mc1_{k,i} - \left( \left\| \begin{matrix} x_k - xs_{k,i} \\ y_k - ys_{k,i} \\ z_k - zs_{k,i} \end{matrix} \right\| + x_{t,k} \right) \right)^2$$

where:
- $x_k, y_k, z_k$ are the spatial coordinates of the position $P1_k$ of the unit 10 that are to be determined,
- $x_{t,k}$ is the clock error of the unit 10 that is to be determined, expressed in the form of a distance added to the computed pseudorange,
- X is the vector of coordinates $x_k, y_k, z_k$ and $x_{t,k}$,
- $xs_{k,i}, ys_{k,i}$ and $zs_{k,i}$ are the spatial coordinates of satellite i obtained from the $PVTs_{k,i}$ estimated by module 50,
- $Mc1_{k,i}$ is the i-th measurement pre-corrected in step 110,
- $w_i$ is a weight assigned to the i-th measurement $Mc1_{k,i}$, and
- Ipmin is the set that contains the indices i of the measurements selected in step 112.

The value of each weight $w_i$ is predetermined depending, for example, on the elevation of satellite i, on the signal-to-noise ratio measured for satellite i, and on the rate at which the distance between the unit 10 and this satellite is varying. In one simplified variant, the weights $w_i$ are constant and, for example, all equal to one.

The values of the coordinates of the vector X that minimize the cost function $f_1$ are estimated using a Gauss-Newton algorithm for example, or any other optimization algorithm such as, inter alia, Levenberg-Marquardt or gradient-descent algorithms, which are generally iterative algorithms. The initial values of the coordinates of the vector X are for example set equal to zero. Here, the search for values of the coordinates of the vector X that minimize the function $f_1$ is stopped:
- after a predetermined number of iterations, for example comprised between two and twenty, or
- when the update of the vector X becomes small, i.e. when the norm of the difference between the vector X obtained at the end of the current iteration and the vector X obtained at the end of the preceding iteration drops below a predetermined threshold. This predetermined threshold is, for example, comprised between $10^{-4}$ and $10^{-10}$.

In a step 116, module 60 establishes the values of the biases $c2_{k,i}$ based on the pre-corrected measurements $Mc1_{k,i}$, on the $PVTs_{k,i}$ and on the position $P1_k$. Here, the measurement biases $c2_{k,i}$ are estimated by minimizing a cost function, denoted $f_2$, dependent on the measurement biases $c2_{k-1,i}$ established for the preceding time $t_{k-1}$.

For example, the cost function $f_2$ is defined by the following relationship:

$$f_2(X, Mc1_{k,i}, P1_k, c1_{k-1,i}) = \|r(Mc1_k, P1_k) - X\|_{R_c^{-1}}^2 + \|X - c2_{k-1}\|_{P_{c,k-1}^{-1}}^2$$

where:
- $Mc1_k$ is the vector formed by the measurements $Mc1_{k,i}$ for i belonging to the set Ipmin,
- $c2_{k-1}$ is the vector formed by the biases $c2_{k-1,i}$ for i belonging to the set Ipmin.

The function $r(Mc1_{k,i}, P1_k)$ is a vector of measurement residues between $Mc1_k$ and the measurements estimated depending on $P1_k$. The i-th component $r_i$ of the vector of residues is defined by the following relationship:

$$r_i = Mc1_{k,i} - \left( \sqrt{(x_k - xs_{k,i})^2 + (y_k - ys_{k,i})^2 + (z_k - zs_{k,i})^2} + x_{t,k} \right).$$

In this text, the symbol $\|A\|_{R^{-1}}^2$ designates the norm to the power of two of the vector A generated by the scalar product defined by the positive definite matrix $R^{-1}$. This norm is defined by the following relationship:

$$\|A\|_{R^{-1}}^2 = A^T R^{-1} A$$

where, in this text, the symbol "$T$" designates the transpose operation, and the symbol "$-1$" designates the operation of inversion of a matrix.

The matrix $R_c$ is the covariance matrix of the residues of the vector $r(Mc1_{k,i}, P1_k)$ For example, here, the matrix $R_c$ is diagonal and its elements are all equal to 25 m².

The matrix $P_{c,k}$ is the covariance matrix of the biases $c2_{k,i}$. It is updated for each time $t_k$ according to the following relationship:

$$P_{c,k} = (R_{c,k-1}^{-1} + R_c^{-1})^{-1}$$

Once the biases $c2_{k,i}$ have been established, execution of process 52 terminates and execution of process 54 begins.

In a step 118, module 62 pre-corrects the measurements $Mb_{k,i}$ to obtain second pre-corrected measurements $Mc2_{k,i}$. Here, the pre-corrected measurements $Mc2_{k,i}$ are obtained based on the measurements $Mb_{k,i}$, on the data contained in the messages $Mn_{k,i}$, on the $PVTs_{k,i}$ estimated by module 50 and on the preceding external PVT2, $PVT2_{k-1}$. Here, step 118 is identical to step 110 except that the position $P2_{k-1}$ contained in $PVT2_{k-1}$ is used instead of the position $P1_{k-1}$.

Once steps 114 and 118 have terminated, in a step 120, corrected measurements $Mc3_{k,i}$ are computed using the following relationship:

$$Mc3_{k,i} = Mc2_{k,i} - c2_{k,i}$$

Next, in a step 122, module 64 estimates $PVT2_k$ based on the PVTs of the satellites, i.e. on the $PVTs_{k,i}$, on the corrected measurements $Mc3_{k,i}$ and on the preceding PVT2, i.e. on $PVT2_{k-1}$. In this example of embodiment, $PVT2_k$ is estimated by minimizing the following cost function $f_3$:

$$f_3(X, Mc3_{k,i}, PVTs_{k,i}, PVTs_{k-1,i}) = \|Mc3_k - h(X)\|_{R_{Mc3}}^2 + \|X - f(PVT2_{k-1})\|_{P_{PVT2}^{-1}}^2$$

where:
  X is the variable allowing the function $f_3$ to be minimized, it contains $PVT2_{k,i}$ and therefore the following elements: $X^T = (x, y, z, v_x, v_y, v_z, x_t, dx_t)$, with:
  x, y and z the coordinates of the position $P2^k$ of the unit 10 in the frame of reference $R_T$,
  $v_x$, $v_y$ and $v_z$ the components of the velocity vector $V2_k$ of the unit 10 in the frame of reference $R_T$,
  $x_t$ the clock bias of the unit 10 with respect to GPS time,
  $dx_t$ the drift of the clock of the unit 10 with respect to GPS time,
  h(X) the measurement function the i-th component of which is defined by the following relationship:

$$h_i(X) = \sqrt{(x-xs_{k,i})^2 + (y-ys_{k,i})^2 + (z-zs_{k,i})^2} + x_t$$

$Mc3_k$ is the vector the i-th component of which is $Mc3_{k,i}$,
  $PVT2_{k-1}$ is the vector $PVT2_k$ estimated for time $t_{k-1}$,
  $R_{Mc3}$ is the covariance matrix of the measurements $Mc3_{k,i}$, it is diagonal and each diagonal element is, here, set to 25 m$^2$
  f is the function defined by the following relationship:

$$f(X) = FX, F = \begin{pmatrix} I_{3\times3} & dt \times I_{3\times3} & 0_{3\times1} & 0_{3\times1} \\ 0_{3\times3} & I_{3\times3} & 0_{3\times1} & 0_{3\times1} \\ 0_{1\times3} & 0_{1\times3} & 1 & dt \\ 0_{1\times3} & 0_{1\times3} & 0 & 1 \end{pmatrix}$$

with:
  $I_{n\times p}$ the identity matrix of size n by p,
  $0_{n\times p}$ the null matrix of size n by p,
  dt the sampling period, here it is equal to $t_k - t_{k-1}$,
  $P_{PVT2}$ is an estimation of the covariance matrix of $PVT2_{k,i}$ it is obtained using the following relationship:

$$P_{PVT2} = FP_{PVT2,k-1}F^T + Q$$

where:
  $P_{PVT2,k-1}$ is the covariance matrix of the preceding PVT2, $PVT2_{k-1}$, and
  Q is a positive symmetric matrix the values of which are given by the following relationship:

$$Q = \begin{pmatrix} 0_{3\times3} & 0_{3\times3} & 0_{3\times1} & 0_{3\times1} \\ 0_{3\times3} & dt \times 10 \times I_{3\times3} & 0_{3\times1} & 0_{3\times1} \\ 0_{1\times3} & 0_{1\times3} & dt \times 0.01 & 0 \\ 0_{1\times3} & 0_{1\times3} & 0 & dt \times 0.04 \end{pmatrix}$$

For example, the cost function $f_3$ is minimized using the Gauss-Newton method.

In a step 124, module 64 updates the estimate $P_{PVT2}$ of the covariance matrix of $PVT2_k$ using the following relationship:

$$P_{PVT2,k}(P_{PVT2}^{-1} + H^T R_{Mc3}^{-1} H)^{-1}$$

where:
  H is the Jacobian matrix of the function h(X) defined above in step 122, and
  $P_{PVT2}$ is the estimate of the covariance matrix computed in step 122.

For the initial time $t_0$, $PVT2_{-1}$ is defined as being the null vector and the covariance matrix $P_{PVT2,-1}$ is the diagonal matrix defined by the following relationship:

$$P_{PVT2,-1} = \begin{pmatrix} 10^{12} \times I_{3\times3} & 0_{3\times3} & 0_{3\times1} & 0_{3\times1} \\ 0_{3\times3} & 10^2 \times I_{3\times3} & 0_{3\times1} & 0_{3\times1} \\ 0_{1\times3} & 0_{1\times3} & 10^{12} & 0 \\ 0_{1\times3} & 0_{1\times3} & 0 & 10^2 \end{pmatrix}$$

Figure 5:
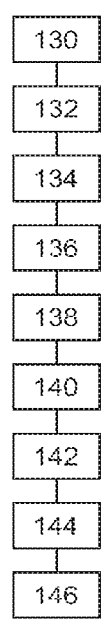
FIG. 5 is a flowchart of a measurement-selecting method implemented in the method of FIG. 4.

One example of embodiment of step 112 of selecting measurements will now be described in detail with reference to the method of FIG. 5.

In an operation 130, module 56 computes a score $s1_0$, for each satellite using the following relationship:

$$s1_{0,i} = \frac{1}{N+1} \sum_{j=0}^{N} cn0_i(k-j)$$

where:
  $cn0_i(k-j)$ is the measurement of the signal-to-noise ratio for satellite i at time $t_{k-j}$, and
  N is a predetermined integer higher than one and, preferably, higher than ten or twenty.

Typically, the measurement $cn0_i(k-j)$ is carried out in step 102 by the baseband processor 34.

Next, in an operation 132, module 56 selects the M best measurements in the sense of the score $s1_{0,i}$. For example, M is equal to eight.

Lastly, a process of detecting and excluding faults based on a sub-set testing approach is used to select the best sub-set of measurements among the M best measurements. To limit computations, the maximum number of faults sought is limited to Mex=2.

More precisely, the best sub-set is selected as follows.

In an operation 134, module 56 generates all the possible sub-sets $E_p$ of M-Mex measurements among the M best measurements, where the index p is a sub-set identifier.

Next, for each generated sub-set EP, module 56 executes the following operations, operations 136 to 140.

In operation 136, module 56 computes the position $P1_{k,p}$ based on the measurements of the sub-set EP by minimizing the following cost function $f_1$:

$$f_1(X, Mc1_{k,i}, PVT_{S_k}) = \sum_{i \in I_p} \omega_i \left( Mc1_{k,i} - \left( \left\| \begin{array}{c} x - xs_{k,i} \\ y - ys_{k,i} \\ z - zs_{k,i} \end{array} \right\| + x_{t,k} \right) \right)^2$$

This function $f_1$ is identical to the function $f_1$ used in step 114 except that the set Ip is the set that contains the indices i of the measurements contained in the sub-set $E_p$. The position minimizing this cost function $f_1$ is found by applying, for example, the same algorithm as was implemented in step 114.

In an operation 138, module 56 computes the following metrics for each sub-set $E_p$: a residue $r_p$, a geometric dilution $GDOP_p$ and a maximum sensitivity of the position error with respect to the residue $r_p$, which is denoted SlopeMaxp.

The residue $r_p$ is equal to the norm of the vector $r(Mc1_{k,p}, P1_{k,p})$, where:

$Mc1_{k,p}$ are the measurements contained in the sub-set $E_p$, and r( . . . ) is the same function as defined in step 116.

The geometric dilution is better known as the geometric dilution of precision. Here it is computed taking into account the position of each of the satellites from which the measurements $Mc1_{k,i}$ of the sub-set $E_p$ and the position $P1_{k,p}$ were obtained.

The parameter $SlopeMax_p$ is computed as defined on pages 105 to 136 of the following document: Salos Andres, C. D, *Integrity monitoring applied to the reception of GNSS signals in urban environments*, PhD Thesis, Institut National Polytechnique de Toulouse, 2012.

In an operation 140, module 56 computes, for each set $E_p$, a score $s1_{1,p}$ using the following relationship:

$$s1_{1,p} = \alpha_1 \|r_p\|^2 + \alpha_2 GDOP_p + \alpha_3 SlopeMax,$$

where $\alpha_1$, $\alpha_2$ and $\alpha_3$ are predetermined weighting coefficients.

In an operation 142, module 56 selects the sub-set $E_p$ that has the lowest score $s1_{1,p}$. The selected sub-set is denoted $E_{pmin}$.

In an operation 144, module 56 validates the best sub-set $E_{pmin}$, by comparing the metrics $r_{pmin}$, $GDOP_{pmin}$ and $SlopeMax_{pmin}$ computed for the sub-set $E_{pmin}$ to predetermined thresholds, Thr0, ThGDOP and ThSlopeMax, respectively. If each of the metrics $r_{pmin}$, $GDOP_{pmin}$ and $SlopeMax_{pmin}$ is lower than its respective threshold, then the sub-set $E_{pmin}$ is validated. In the contrary case, fault detection is said to be impossible, and no measurement is validated. When no measurement is validated, the biases $c2_{k,i}$ are considered unchanged and set equal to the biases $c2_{k-1,i}$.

Only if the best sub-set $E_{pmin}$ has been validated, in an operation 146, module 56 computes the consistency of the remaining measurements with respect to the selected sub-set $E_{pmin}$. The remaining measurements are those not belonging to the sub-set $E_{pmin}$. Consistency is tested by comparing, to a predetermined threshold Thr1, each residue of the remaining measurements. The residue of each remaining measurement is computed using the following relationship:

$$r_i = Mc1_{k,i} - h(P1_{k,pmin})$$

where:

the function h( ) is the same function as implemented in step 122, and the indices i here correspond only to the indices i of the remaining measurements.

A remaining measurement is consistent with the measurements of the sub-set $E_{pmin}$ if the residue $r_i$ computed for this remaining measurement is less than a predetermined threshold Thr1. Next, all the remaining measurements that are consistent with the measurements of the sub-set $E_{pmin}$ are added to the sub-set $E_{pmin}$ and therefore used in the rest of process 52. In contrast, inconsistent remaining measurements are not used in the rest of process 52.

SECTION II: VARIANTS

Variants of the Navigation Unit:

The navigation unit 10 has been described in the particular case of use within a locating system comprising, in addition, the inertial measurement unit 12. However, the unit 10 may be used in any locating system and, in particular, in locating systems not comprising any inertial measurement unit or comprising, in addition or instead, other sensors such as an odometer.

The beacons may be satellites of one or more constellations such as GPS (acronym of Global Positioning System), Glonass, Galileo and Beidou.

What has been described in the particular case where the beacons are satellites may be applied to any locating system and, in particular, to locating systems where the beacons are not satellites. For example, what has been described here may also be implemented in the case where the beacons are fixed beacons on Earth transmitting messages. For example, such fixed beacons may be installed in a shopping centre to locate pedestrians or be installed in proximity to an aerial lift to locate the position of a cable car. These fixed beacons are for example ultra-wide band (UWB) beacons. The term "ultra-wideband beacon" or "UWB beacon" here designates a transceiver that uses a wide frequency band to send and receive the messages. A "wide" frequency band is a frequency band the width of which is larger than $0.2f_c$, where $f_c$ is the central frequency of this frequency band. Typically, a wide frequency band has a width larger than 250 MHz or even larger than 400 MHz.

Instead of emitting electromagnetic waves to transmit the messages, the beacons may emit ultrasound. In this case, the speed of propagation of the messages through space is equal to the speed of sound and not to the speed of light.

Variants of the Locating Method:

To measure a pseudorange, it is not necessary for the messages transmitted by the beacons to contain the time of transmission of this message. For example, this is not necessary if the clocks of the beacons and of the navigation unit are temporally synchronized with one another. In this case, for example, the beacons transmit the messages at times $te_k$ known to the navigation unit and hence these times $te_k$ do not need to be contained in the transmitted messages. According to another variant, the times $te_{k,i}$ of transmission are computed by the navigation unit, for example based on a time of transmission of a message by the navigation unit and on the time of receipt of the response to this message transmitted by the beacon.

Step 110 of pre-correcting the raw measurement may be carried out differently. In particular, there are other models of the perturbations introduced by the ionosphere or troposphere that are usable instead of the STANAG model. In particular, the model used may also be parametrized by data contained in the messages $Mn_{k,i}$. In the case where the beacons are not satellites, another model of the perturbations introduced by the exterior environment through which the navigation unit is moving may be used. In one simplified embodiment, step 110 of pre-correcting the raw measurements is omitted. Specifically, in certain contexts, such as in the case where the beacons are fixed to the surface of the Earth, such pre-correction may be needless.

Step 112 of selecting corrected measurements may be carried out differently. For example, one of the fault detection and exclusion methods described in the following articles may be used instead of the method described in Section I:

H. Kuusniemi, G. Lachapelle: "GNSS Signal Reliability Testing in Urban and Indoor Environments", Proceedings of the 2004 National Technical Meeting of The Institute of Navigation, San Diego, CA, pp. 210-224, 2004;

N. Zhu: "GNSS Propagation Channel Modeling in Constrained Environments: Contribution to the Improvements of the Geolocation Service Quality", PhD thesis, University of Lille FR, 2018.

In another variant of step 112, instead of using $PVT2_{k-1}$ to make the selection, $PVT1_{k-1}$ is used. Other methods for selecting the best sub-set of measurements from the M best measurements in the sense of the score $s1_{0,i}$ may be used. Scores other than the scores $s1_{0,i}$ and $s1_{1,i}$ may also be used to select the best measurements.

In one simplified embodiment, the selecting step 112 is omitted.

Other embodiments of step 114 of estimating the position $P1_{k,i}$ are possible. For example, as a variant, it is an internal PVT, $PVT1_{k,i}$, that is estimated and not only the internal position $P1_{k,i}$. The internal velocity $V1_{k,i}$ may be estimated based on Doppler measurements extracted by the baseband processor 34. In the latter case, the various variants described below of step 122 of estimating $PVT2_{k,i}$ are applicable to step 114.

As a variant, in step 116, the data contained in the messages $Mn_{k,i}$ may also be taken into account to establish the values of the biases $c2_{k,i}$. Other cost functions are usable instead of the cost function $f_2$ to establish the biases $c2_{k,i}$. For example, in one simplified embodiment, the biases $c2_{k,i}$ are established by minimizing the following cost function $f_{2,1}$:

$$f_{2,1}(X, Mc1_{k,i}, P1_k) = \|r(Mc1_k, P1_k) - X\|_{R_c^{-1}}^2$$

The biases $c2_{k,i}$ may also be established using a Kalman filter instead of minimizing a cost function.

There are yet other methods of estimating the biases $c2_{k,i}$. For example, process 52 is replaced by N processes $52^{(p)}$ that run in parallel to one another, where the exponent (p) is an identifier of the process. The exponent (p) is an integer comprised between 1 and N. Each process $52^{(p)}$ delivers as output respective biases denoted $c2_{k,i}^{(p)}$. Here, the measurement biases $c2_{k,i}^{(p)}$ are established by each process $52(p)$ by executing steps 110, 112, 114 and 116 described above but with different parameters from those used by the other processes $52^{(p)}$. In this example, the function $f_2$ is parametrized by the matrices $R_c$ and $P_{c,k-1}$ and each process $52^{(p)}$ corresponds to specific values of the coefficients of these matrices $R_c$ and $P_{c,k-1}$. For example, process $52^{(1)}$ uses matrices $R_c^{(1)}$ and $P_{c,k-1}^{(1)}$ that are identical to the matrices $R_c$ and $P_{c,k-1}$ used in the case of the method of FIG. 4. Process $52^{(2)}$ uses matrices, $R_c^{(2)}$ and $P_{c,k-1}^{(2)}$ respectively, the coefficients of which are for example ten times lower than the corresponding coefficients of the matrices $R_c^{(1)}$ and $P_{cmk-1}^{(1)}$. In contrast, process $52^{(3)}$ uses matrices, $R_c^{(3)}$ and $P_{c,k-1}^{(3)}$ respectively, the coefficients of which are for example ten times higher than the corresponding coefficients of the matrices $R_c^{(1)}$ and $P_{c,k-1}^{(1)}$.

Next, the best set of biases $c2_{k,i}^{(p)}$ is selected from the N set of biases $c2_{k,i}^{(p)}$ established by the processes $52^{(p)}$. Each bias $c2_{k,i}$ is then set equal to the bias $c2_{k,i}^{(p)}$ of the best set of biases $c2_{k,i}^{(p)}$. For example, the criterion used to select the best set of biases $c2_{k,i}^{(p)}$ is the norm of the innovation denoted $nino^{(p)}$ and each bias $c2_{k,i}$ is equal to the bias $c2_{k,i}^{(p)}$ of the set of biases $c2_{k,i}^{(p)}$ that possesses the lowest value $nino^{(p)}$. For example, the norm $nino^{(p)}$ of the set of biases $c2_{k,i}^{(p)}$ is defined by the following relationship:

$$nino^{(p)} = \|Mc2_k - c2_k^{(p)} - h(f(PVT2^{k-1}))\|$$

where:
- $Mc2_k$ is the vector the coefficients of which are the corrected measurements $Mc2_{k,i}$
- $c2_k^{(p)}$ is the vector the coefficients of which are the biases $c2_{k,i}^{(p)}$,
- $PVT2_{k-1}$ is the vector $PVT2_k$ estimated for time $t_{k-1}$,
- the functions h( ) and f( ) are the same as those used in the function $f_3$ described above.

After step 116 of establishing the biases $c2_{k,i}$ and before step 120 of correcting the measurements $Mb_{k,i}$ with the biases $c2_{k,i}$, the method may comprise other steps. For example, the method comprises a step of testing the update of the measurement biases $c2_{k,i}$. This testing step makes it possible to detect whether the update of the biases $c2_{k,i}$ complies with a confidence indicator such as the expected standard deviation. For example, the test carried out is the test defined by the following relationship for each of the indices i of the set Ipmin:

$$|r_i(Mc1_{k,i}, P1_k) - c2_{k-1}| < \alpha\sqrt{(R_c + P_c)_{ii}}$$

where:
- $r_i(Mc1_{k,i}, P1)$ is the same function as defined above in step 116, and
- the notation $(M)_{ii}$ designates the i-th diagonal element of the matrix M,
- $R_c$ and $P_c$ are the same matrices as defined in step 116,
- $\alpha$ is a predetermined coefficient set by the user.

If, for each of the indices i of the set $I_{pmin}$, the above test is passed, then the update is accepted. In the contrary case, the update is deleted and the values of the biases $c2_{k,i}$ are not changed, i.e. they are set equal to the values of the biases $c2_{k-1,i}$.

Other confidence indicators may be established in respect of the precision of the established biases $c2_{k,i}$. For example, in the case where the biases $c2_{k,i}$ are established by a Kalman filter, the estimated covariance associated with each bias $c2_{k,i}$ is such an indicator of precision.

After step 116 of establishing the biases $c2_{k,i}$ and before step 120 of correcting the measurements $Mb_{k,i}$ with the biases $c2_{k,i}$, the method may also comprise a step of filtering the biases $c2_{k,i}$, for example using a moving average or a Kalman filter, in order to make their estimation more precise. It is then the filtered biases that are used to obtain the corrected measurements $Mc3_{k,i}$.

Step 118 may be executed before one of steps 110, 112 and 114.

As a variant, in step 118, the pre-corrected measurements $Mc2_{k,i}$ are simply set equal to the pre-corrected measurements $Mc1_{k,i}$. As a variant, step 118 is omitted.

Between steps 118 and 120, as a variant, the module 62 selects pre-corrected measurements $Mc2_{k,i}$, these then being the only ones to be used in the rest of process 54. For example, the module 62 carries out this selecting step in the same way as step 112 or its variants.

Many variants of step 122 of estimating $PVT2_{k,i}$ are possible. For example, $PVT2_{k,i}$ may also be estimated taking into account the data contained in the messages $Mn_{k,i}$.

The described computation of $PVT2_k$ uses, among other input data, a matrix $R_{Mc3}$ defining the precision of each of the measurements. This matrix $R_{Mc3}$ need not remain constant. For example, it is adjusted depending on the bias correction applied in step 118 and on the confidence accorded to this correction, in order to better reflect the uncertainty in each measurement at the end of this correction.

Many other algorithms may be used to determine a position, a PVT or indeed a PT based on the input data. For example, Kalman filters, particle filters or artificial-intelligence algorithms may also be used. In addition, as illustrated in the embodiment of Section I, a position, a PVT or indeed a PT may also be computed based on a sub-set of the available input signals. In other words, certain signals may be deliberately excluded from the computation if it is determined that they are associated with an excessively erroneous measurement. Many algorithms for selecting satellite signals are known in the art.

In one simplified embodiment, the unit 10 delivers only its position. Its velocity and its clock error are not computed or are not delivered to the computer 20. When the clock error is not computed, the minimum number of satellites required to determine the position of the unit 10 is equal to three. In addition, in this case, the raw measurements may be only pseudorange measurements. Other measurements, such as of the Doppler effect, are omitted.

SECTION III: ADVANTAGES OF THE DESCRIBED EMBODIMENTS

Since the biases are established taking into account the internal position of the navigation unit, the biases are more precise that those computed without taking into account the position of the navigation unit. In addition, since the biases are established without taking into account the external position of the navigation unit, the stability and robustness of the locating method are improved. Specifically, an error in the establishment of the biases may propagate to the estimation of the external position. In contrast, the error in the estimation of the external position cannot propagate to the establishment of bias. Thus, the stability and robustness of the locating method are enhanced without however deteriorating precision.

Selecting, using the external position at the preceding time $t_{k-1}$, beacons the messages of which are then processed to establish the measurement biases, allows the reliability and precision of this selection to be improved because the external position is more precise than the internal position. This therefore allows the measurement biases to be established more precisely and therefore a more precise external position to be obtained at time $t_k$. In addition, this does not compromise the robustness of the locating method because the external position only influences selection of the processed messages. In particular, the external position does not influence the content of these messages, their times of receipt and does not influence the processing operations executed to establish the measurement biases.

Minimizing the difference between the measurement biases for times $t_k$ and $t_{k-1}$ increases the precision of the location.

Use of the parametrized model to estimate the error caused by propagation of the messages of the beacons through the ionosphere or troposphere allows the precision of the location to be enhanced.

The invention claimed is:

1. A method for locating a navigation unit in an environment containing beacons transmitting messages, the method comprising execution of the following steps for each time $t_k$ of a temporal sequence of times $\{t_0, \ldots ; t_{k-1}, t_k; \ldots\}$:
   (a) receiving messages transmitted by at least three beacons,
   (b) extracting raw measurements of pseudoranges separating the navigation unit from each of the at least three beacons based on times of receipt of the messages as measured by the navigation unit and on a speed of propagation of the messages through space,
   (c) estimating an internal position of the navigation unit at the time $t_k$ based on the raw measurements extracted for the time $t_k$, on a preceding internal position of the navigation unit estimated at the time $t_{k-1}$ and on positions of the beacons,
   (d) for a plurality of beacons, establishing a measurement bias for the time $t_k$ that, when subtracted from the raw measurement extracted based on the time of receipt of the message transmitted by the beacon, allows an error affecting the raw measurement to be decreased, the measurement bias being established based on a difference between:
      (1) a computed pseudorange separating the beacon from the navigation unit, the computed pseudorange being computed based on a position of the beacon and on an internal position of the navigation unit estimated for the time $t_k$, and
      (2) a measured pseudorange separating the beacon from the navigation unit, the measured pseudorange being computed based on the raw pseudorange measurement extracted for the beacon for the time $t_k$ and without taking into account the internal position of the navigation unit,
   (e) for each beacon for which a measurement bias was established for the time $t_k$, computing a corrected measurement of the pseudorange at the time $t_k$ by adding the measurement bias established for the beacon to a raw measurement of the pseudorange for the beacon extracted at the time $t_k$, and
   (f) estimating an external position of the navigation unit at the time $t_k$ based on:
      (i) positions of the beacons for which a corrected measurement of the pseudorange at the time $t_k$ was computed,
      (ii) corrected pseudorange measurements computed for the time $t_k$, and
      (iii) the preceding external position of the navigation unit estimated for the preceding time $t_{k-1}$,
   wherein steps (b), (c) and (d) are performed without taking into account the external position of the navigation unit.

2. The method according to claim 1, wherein:
   the method comprises, after step (b) and before step (c), selecting, depending on the external position of the navigation unit at the preceding time $t_{k-1}$, a limited number of raw measurements extracted from all the raw measurements extracted in step (b) for the time $t_k$, and
   in steps (c) and (d), only the raw measurements thus selected are used, and the raw measurements not selected are ignored.

3. The method according to claim 1, wherein each measurement bias for the time $t_k$ is also established by minimizing a difference between the measurement bias for the time $t_k$ and the measurement bias established for the preceding time $t_{k-1}$.

4. The method according to claim 1, wherein each beacon is a satellite in orbit around the Earth.

5. The method according to claim 4, wherein after step (b) and before step (c), the method comprises a step of pre-correcting the extracted raw measurements, the pre-correcting step comprising, for each beacon having transmitted a message based on which a pseudorange is extracted:
   establishing an error caused by propagation of the message of the beacon through the ionosphere or the troposphere, a predetermined model parametrized by the internal position of the navigation unit estimated for the preceding time $t_{k-1}$ being used, and subtracting the established error from the extracted raw measurement to obtain a pre-corrected raw measurement, and in steps (c) and (d), using the pre-corrected raw measurements.

6. A non-transitory data storage medium that is readable by a microprocessor, comprising instructions that are executable by the microprocessor, wherein the medium comprises non-transitory instructions for executing a locating method according to claim 1, when the instructions are executed by the microprocessor.

7. A navigation unit configured to move through an environment containing beacons transmitting messages, the navigation unit comprising:

a microprocessor configured to execute the following steps for each time $t_k$ of a temporal sequence of times $\{t_0; \ldots ; t_{k-1}; t_k; \ldots \}$:

(a) receiving messages transmitted by at least three beacons, (b) extracting raw measurements of pseudoranges separating the navigation unit from each of the at least three beacons based on times of receipt of the messages as measured by the navigation unit and on a speed of propagation of the messages through space, (c) estimating an internal position of the navigation unit at the time $t_k$ based on the raw measurements extracted for the time $t_k$, on a preceding internal position of the navigation unit estimated at the time $t_{k-1}$ and on positions of the beacons, (d) for a plurality of beacons, establishing a measurement bias for the time $t_k$ that, when subtracted from the raw measurement extracted based on the time of receipt of the message transmitted by the beacon, allows an error affecting the raw measurement to be decreased, the measurement bias being established based on a difference between:

(1) a computed pseudorange separating the beacon from the navigation unit, the computed pseudorange being computed based on a position of the beacon and on an internal position of the navigation unit estimated for the time $t_k$; and (2) a measured pseudorange separating the beacon from the navigation unit, the measured pseudorange being computed based on the raw pseudorange measurement extracted for the beacon for the time $t_k$ and without taking into account the internal position of the navigation unit, (e) for each beacon for which a measurement bias was established for the time $t_k$, computing a corrected measurement of the pseudorange at the time $t_k$ by adding the measurement bias established for the beacon to a raw measurement of the pseudorange for the beacon extracted at the time $t_k$, (f) estimating an external position of the navigation unit at the time $t_k$ based on:

(i) positions of the beacons for which a corrected measurement of the pseudorange at the time ti was computed, (ii) corrected pseudorange measurements computed for the time $t_k$, (iii) the preceding external position of the navigation unit estimated for the preceding time $t_{k-1}$, wherein steps (b), (c), and (d) are performed without taking into account the external position of the navigation unit.

* * * * *